United States Patent [19]

Stec

[11] Patent Number: 5,249,038
[45] Date of Patent: Sep. 28, 1993

[54] SYSTEM AND METHOD FOR CONVERTING COMPONENT VIDEO SIGNALS TO A COMPOSITE VIDEO SIGNAL COMPATIBLE WITH THE PAL STANDARD

[75] Inventor: Kevin J. Stec, Medford, N.J.

[73] Assignee: Matsushita Electric Corporation of America, Secaucus, N.J.

[21] Appl. No.: 854,362

[22] Filed: Mar. 19, 1992

[51] Int. Cl.⁵ .......................................... H04N 11/20
[52] U.S. Cl. .................................................. 358/11
[58] Field of Search ................... 358/11, 140, 138, 12, 358/14, 15

[56] References Cited

U.S. PATENT DOCUMENTS

4,051,516  9/1977  Weston ............................... 358/11

Primary Examiner—Victor R. Kostak
Attorney, Agent, or Firm—Ratner & Prestia

[57] ABSTRACT

A system which converts sampled component video signals having a first sample rate to a digital composite video signal compatible with the PAL standard and having a sample rate which is incompatible with said first sample rate. The system uses an adder and subtracter to generate the sum and difference of the two color-difference signals. The sum and difference signals along with the luminance signal are then interpolated and combined to generate a digital composite signal compatible with the PAL standard.

12 Claims, 3 Drawing Sheets

SYSTEM AND METHOD FOR CONVERTING COMPONENT VIDEO SIGNALS TO A COMPOSITE VIDEO SIGNAL COMPATIBLE WITH THE PAL STANDARD

BACKGROUND OF THE INVENTION

The invention relates to a system and method for converting digital component video signals, including a luminance signal and two-color difference signals having sample rates that are incompatible with the Phase Alternate Line (PAL) standard, into a digital composite video signal compatible with the PAL standard.

As used herein, the term "incompatible sampling rate" describes a sampling frequency which has no common multiple or only a relatively large common multiple with 17.734475 MHz, which is a commonly used sampling frequency for PAL signals. This frequency is four times $F_p$, the PAL color subcarrier frequency.

Typically, when converting sampled data digital component video signals to a sampled data composite video PAL signal which has an incompatible sample rate, the sampled data digital component video signals are converted to analog signals, processed to generate an analog composite PAL signal, and then the analog composite PAL signal is sampled to generate a digital composite PAL signal.

The processing which generates the analog composite PAL signal generally begins by bandlimiting the analog signals. The bandlimited analog color difference signals are then used to modulate two quadrature phase related subcarrier signals which are added to the bandlimited analog luminance signal to generate an analog composite PAL signal. As stated above, the analog composite PAL signal is then sampled to form a digital composite PAL signal.

This processing system and method introduces sampling quantization errors during the analog to digital, and digital to analog conversions, and requires a substantial amount of processing.

The present invention performs the conversion process entirely in the digital domain using a method that requires fewer operations and so significantly reduces any errors. The digital composite video signals generated by this invention also can be converted to analog signals if desired.

As way of background, an analog PAL signal consists of a luminance signal, denoted as Y, added to a chrominance signal generated by modulating two quadrature-phase related sinusoidal signals at a frequency $f_p$ by two color-difference signals, denoted as U and V.

SUMMARY OF THE INVENTION

The present invention is a system and method for converting component video signals, including a luminance signal component and two color-difference signal components at a first sample rate, to a composite video PAL signal having a second sample rate. The system generates signals which represent the sum and difference of the two color-difference signal components at the first sample rate. The sum and difference component signals are then interpolated and combined with the luminance signal in a predetermined order to generate a composite video signal at the second sample rate that is compatible with the PAL standard.

DETAILED DESCRIPTION OF THE INVENTION

OVERVIEW

Figure 1:
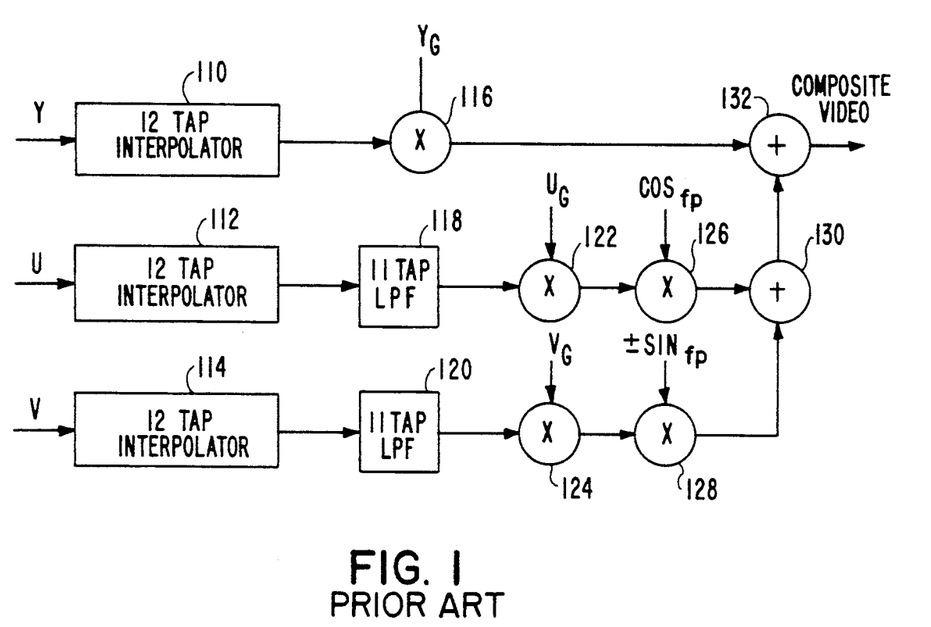
FIG. 1, labeled prior art, is a block diagram of a conventional system for generating a PAL composite video signal from digital component video signals Y, U and V.

FIG. 1 shows an exemplary prior art system which generated a digital PAL composite video signal from digital component signals Y, U and V which have a sampling rate that is incompatible with the desired PAL sampling rate of 17.734475 MHz (hereinafter 17.7 MHz). In this exemplary system, the sampled data Y, U and V signals are separately resampled by the respective interpolators 110, 112 and 114 to provide samples at a rate which is compatible with the PAL standard. Next, the U and V samples are band-limited by respective 11 tap low-pass filters 118 and 120 so that they occupy a band of frequencies consistent with the PAL standard. Each of the signals, Y, U and V is then scaled by a respective gain factor $Y_G$, $U_G$ and $V_G$ by multipliers 116, 122 and 124, respectively. The scaled U and V signals are then used to modulate respective sampled data color subcarrier signals applied to the multipliers 126 and 128. These modulated signals are then summed by an adder 130 and added to the scaled luminance signal by an adder 132 to produce the digital PAL composite video signal.

The circuit shown in FIG. 1 uses 36 multiply operations and 33 add operations in the three 12-tap interpolators, 22 multiply operations and 20 add operations in the two low-pass filters, three multiply operations for gain adjustment and two multiply operations and two add operations for modulation. This results in a total of 63 multiply operations and 55 add operations.

By contrast, the circuit described below accomplishes the same function using only 24 multiply operations and 25 add operations. This is possible because a single 12-tap interpolator is used to interpolate, bandlimit and modulate the two color difference signals U and V.

To better explain the operation of the invention, it is helpful to first describe the PAL composite video signal mathematically. It is generally known that $Y + U\cos(f_p) \pm V\sin(f_p)$ represents an analog PAL signal, i.e., the luminance signal Y added to two suppressed subcarrier signals at a frequency of $f_p$ which are separated in phase by $\pi/2$ and modulated by the two color difference signals, U and V. The V subcarrier signal changes phase by $\pi/2$ from line to line so the above expression is $Y + U\cos(f_p) + V\sin(f_p)$ for line n and $Y + U\cos(f_p) - V\sin(f_p)$ for line n+1.

However, it can shown, using the mathematical identity $\cos(\alpha \pm \beta) = \cos\alpha\cos\beta \pm \sin\alpha\sin\beta$, that $Y + U\cos(f_p) \pm V\sin(f_p)$ is also equal to $Y + (\sqrt{2}/2)(U \pm V)\cos(f_p - \pi/4) + (\sqrt{2}/2)(U \mp V)\cos(f_p + \pi/4)$.

In addition, it can shown that sampling the analog signal $Y+(\pi2/2)(U\pm V)\cos(f_p-\pi/4)+(\sqrt{2}/2)(U\pm V)\cos(f_p+\pi/4)$ at the rate $4*f_p$ and at phases of $\pi/4$, $3\pi/4$, $5\pi/4$ and $7\pi/4$ will generate the sample pattern $Y+(\sqrt{2}/2)(U\pm V)$, $Y-(\sqrt{2}/2)(U\pm V)$, $Y-(\sqrt{2}/2)(U\pm V)$, $Y+(\sqrt{2}/2)(U\pm V)$, $Y+(\sqrt{2}/2)(U+V)$, .... Thus, sampling $Y+U\cos(f_p)\pm V\sin(f_p)$ at the rate $4*f_p$ will also generate the sample pattern $Y+(\sqrt{2}/2)(U\pm V)$, $Y-(\sqrt{2}/2)(U\pm V)$, $Y-(\sqrt{2}/2)(U\pm V)$, $Y+(\sqrt{2}/2)(U\pm V)$, ....

Therefore, to create a sampled data digital composite video PAL signal from the component signals, Y, U, and V, a system may combine the digitally sampled data components, Y, U, and V, in the above pattern.

In addition, depending on the component signals, it may be desirable to perform other operations during the conversion of the component signals to the composite PAL signal. The Y, U and V digital data samples are desirably provided at a $4*f_p$ rate. If the digital samples are provided at a different rate, the target rate may be achieved by decimating and/or interpolating the Y, (U−V) and (U+V) sampled data signals. The bandwidth, i.e., the range of frequencies occupied by the signals Y, (U−V), and (U+V), desirably should be limited to the range required by the PAL standard by use of bandlimiting filters. In addition, the gain of the Y, (U−V) and (U+V) signals desirably should be adjusted to the proper gain for the PAL standard. Last, if the input signals have an orthogonal sampling structure, the signals desirably should be properly aligned from line to line, i.e., the signals should be resampled so corresponding samples on successive lines on the picture screen are offset to avoid possible spatial distortion, when the image is displayed.

Figure 2:
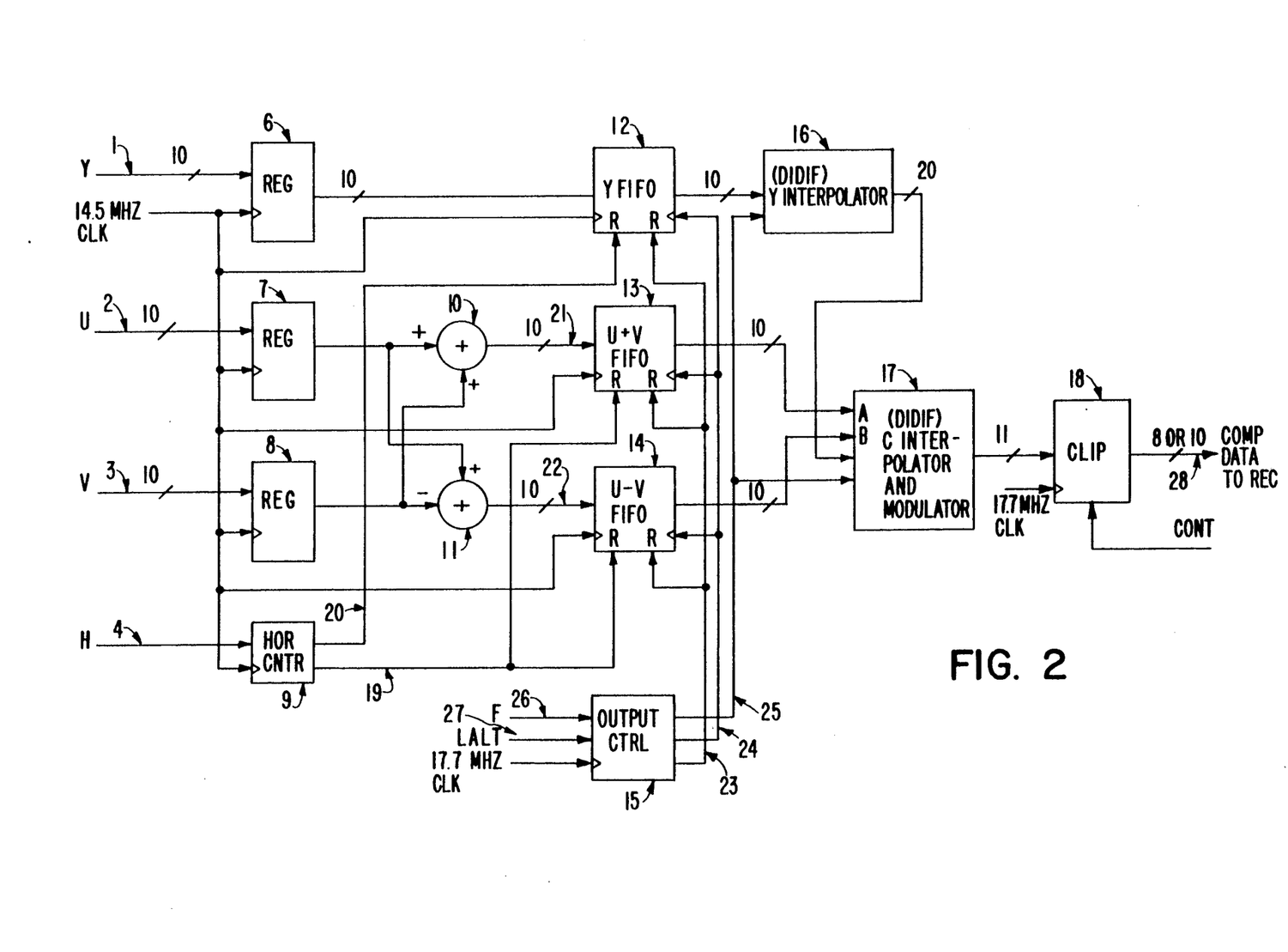
FIG. 2 illustrates a system for generating a digital PAL composite video signal from digital component video signals which contains an embodiment of the invention.

The system is FIG. 2 embodies the current invention. The input sample data rate, the first sample rate, is equal to 14.5 MHz, and the output sample data rate is 17.7 MHz, the second sample rate. The system performs the operations necessary to change the sample data rate from the first sampling rate to the second sampling rate.

In addition the system in FIG. 2 performs the operations necessary to provide the desired gain, bandwidth, and line alignment of a composite PAL signal from the component signals. The component input signals Y, U, and V to the system are 10 bit data samples provided at the rate of 14.5 MHz from a raster scanning device which has an orthogonal sampling structure. That is to say, one which samples the image at the same horizontal positions on each line of the image. The bandwidth and gain of the component signal inputs Y, U, and V are also improper for the PAL standard. The system in FIG. 2 has the additional inputs of a 14.5 MHz clock signal 5, the horizontal line rate signal H 4, the framing pulse signal F 26, the one-half line rate signal LALT 27, and a 17.7 MHz clock signal. The output signal 28 of the system in FIG. 2 is a digital composite PAL signal that is either 8 or 10 bits per sample.

The system receives and stores component signals, Y, U, and V into registers 6, 7, and 8, respectively. The luminance signal, Y, and the sum and difference of the two color-difference signals (i.e. (U+V) and (U−V)) are then stored in FIFO memory elements 12, 13, and 14, respectively. The FIFO memory elements, 12, 13, and 14, are part of the process which changes the sample rate of the signals from the first sample rate of 14.5 MHz to the second sample rate of 17.7 MHz.

The luminance signal output from FIFO memory element 12 is then digitally filtered by interpolator 16 (shown in FIG. 3) to complete the sample rate conversion process. This process interpolates the sample data values from FIFO memory element 12 to reduce the distortion caused by the rate conversion process.

In addition, the digital filtering process in interpolator 16 also adjusts the gain of the signal, bandlimits the signal, and resamples the signal so corresponding samples on successive lines on the picture screen are offset.

Figure 3:
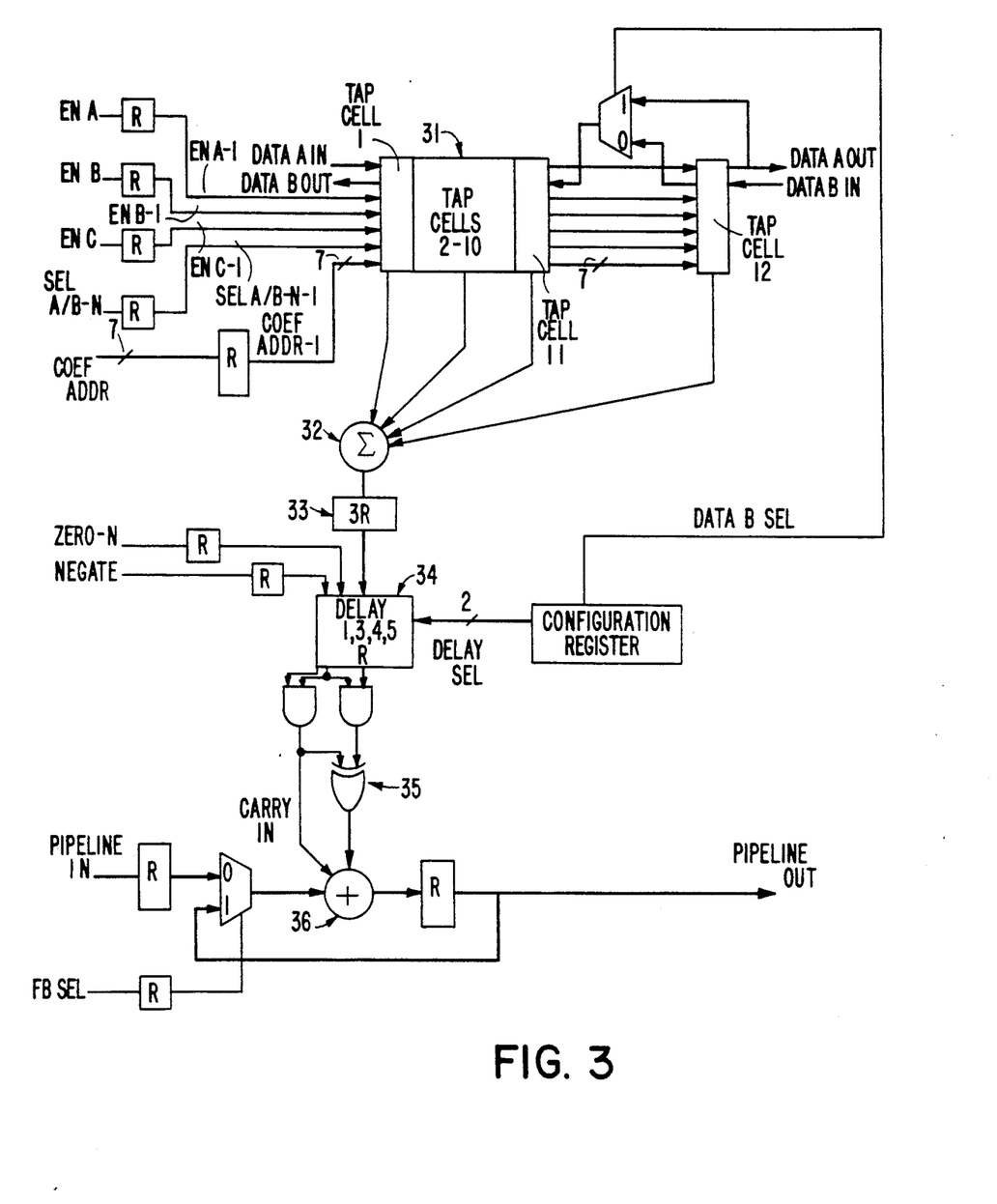
FIG. 3 illustrates an embodiment of an interpolator/modulator used in the exemplary embodiment shown in FIG. 2.

In interpolator/modulator 17, shown in FIG. 3, the sum and difference values held at the output of FIFO memory elements 13 and 14 are interpolated, bandlimited, gain adjusted, resampled, and then modulated (combined) with the luminance values held at the output of interpolator 16. Last, the values held at the output of interpolator/modulator 17 are clipped from 11 bits per sample to 8 or 10 bits per sample as required by the hardware or recording device that receives the output signal of this system.

DETAILED DESCRIPTION OF THE EXEMPLARY EMBODIMENT

In operation, the system first loads the data signals, Y, U and V into the registers 6, 7, and 8, respectively, synchronous with the 14.5 MHz clock signal 5.

The registers, 6, 7 and 8 hold the data samples available at their output ports continuously until another pulse of the 14.5 MHz clock signal 5 is received, then new samples are loaded into the registers and made available at their output ports.

An adder 10 and subtracter 11 are used to produce the sum and difference of the two color-difference samples held by the registers 7, and 8. Adder 10 produces samples 21 which are the sum of the values held by registers 7 and 8, i.e. the sum of the two color-difference signals, (U+V). Subtracter 11 produces samples 22 which are the difference of the values held by registers 7 and 8, i.e. the difference of the two color-difference signals, (U−V).

The horizontal counter 9 uses the 14.5 MHz clock signal 5 and the horizontal line rate signal H to generate two control signals 19 and 20. The horizontal counter 9 counts the number of picture elements (pixels) on each line and the counter is reset for each new line by the horizontal line rate signal H. For each horizontal line of pixels the horizontal counter 9 generates write reset control signals 19 and 20.

Output signal 19 is used to periodically reset the First In First Out (FIFO) memory elements 13 and 14 to their starting write addresses and output signal 20 is used to reset FIFO memory element 12 to its starting write address. Two separate reset signals are used because the input signals to FIFOs 13 and 14 are time delayed by the operations of the adder 10 and subtracter 11, so desirably the write reset signal 19 should lag behind the write reset signal 20 by the amount of the time delay caused by the addition and subtraction operations.

The FIFO memory elements, 12, 13, and 14 provide part of the means for converting the input data rate, the first sample rate, 14.5 MHz to the output data rate, the second sample rate, 17.7 MHz ($4*f_p$). FIFO memory element 12 stores the value held by register 6 into its memory when a pulse is received from the 14.5 MHz clock signal 5. The FIFO memory element holds the oldest (in time) value in its memory at its output. The oldest value in the memory of FIFO memory element 12 is discarded when a pulse is received from a gated 17.7 MHz clock signal 24. The gated clock signal 24 is generated by the control circuitry 15 from the input 17.7 MHz clock signal. Clock signal 24 is gated to inhibit the FIFOs 12, 13 and 14 from providing sample values when they are not needed by the interpolators (i.e. when consecutive output samples are generated from respectively different weightings of a single set of input samples.

By the use of two separate reset control signals and two separate clock signals, FIFO memory element 12 holds input values received at the rate of 14.5 MHz on its output at an effective rate of 17.7 MHz. The write reset control signal 20 resets the FIFO 12 to its starting write address at the start of each horizontal line of input video data while the read reset control signal 23 resets the read address to its initial value at the start of each horizontal line of output video data.

In the exemplary embodiment the FIFO memory element 12 is a two-field (2 V) delay element that produces a time delay equal to the number of sample data values in one image frame. This capacity of elements is desirable to allow the synchronization of the input data samples with other signals used in the studio, based on the field rate signal 26. Alternatively, the FIFO memory element 12 could be a 1H delay element having a number of elements equal to the number of pixels in one line of the image. In this instance, the horizontal line rate 4 could be used to synchronize the input data samples with external signals. If no synchronization is desired, the FIFO memory element 12 may provide, for example, a three-pixel delay. Using a delay of this magnitude is desirable since it is possible the value provided by register 6 may be changing when the two previously (in time) values stored in FIFO memory element 12 still need to be read.

FIFO memory elements 13 and 14 operate in the same manner although they use a different input write reset signal 19 than FIFO memory element 12 for reasons outlined previously. FIFO memory elements 12, 13, and 14, provide luminance data Y, the sum of the two color-difference data U+V, and the difference of the two color-difference data U−V, respectively, at a rate of 17.7 MHz.

Output Control 15 uses the input signals, framing pulse signal F, the one-half line rate signal LALT, and the input 17.7 MHz clock signal to generate the read reset signal 23 and the coefficient/read control signal 25. The gated 17.7 MHz clock signal 24 is used by the FIFO memory elements 12, 13, and 14 to provide samples at the desired sample rate to the interpolators 16 and 17. Coefficient/read control signal 25 is used in interpolator 16 and in interpolator/modulator 17 to select which coefficients to use in the digital filtering processes and to signal the interpolators to read and store the values from the respective FIFO memory elements 12, 13, and 14. Samples are only processed by this system during the active video interval. That is to say exclusive of the horizontal and vertical blanking intervals. The horizontal and vertical synchronization signals and the color burst signal which are inserted in the blanking interval are generated by other circuits (not shown) and combined with the output signal 28 to generate the complete baseband composite video signal.

Interpolator 16, shown in FIG. 3, is used in conjunction with FIFO 12 to perform the rate conversion of the luminance signal from the first data sample rate to the second data sample rate. In addition, interpolator 16 is used to adjust the gain of the signal, bandlimit the signal, and to resample the signal so corresponding samples on successive lines of the display image are offset to meet the PAL standard. The interpolator 16 is described in detail in U.S. Pat. No. 5,057,911, entitled SYSTEM AND METHOD FOR CONVERSION OF DIGITAL VIDEO SIGNALS which is hereby incorporated by reference for its teaching on the operation of the interpolator.

The interpolator 16 is a general purpose interpolation/modulator which may be programmed via a coefficient/read control signal 25 to perform a variety of interpolation operations. Interpolator 16 receives its input signals, DATA A IN and COEF ADDR, from output values held by FIFO memory element 12 and coefficient/read control signal 25, respectively.

The interpolation processing is performed in FIFO 12 and interpolator 16. Samples values are received at the first sample data rate by FIFO 12 and are produced at the second sample data rate by interpolator 16. Since the second sample data rate is higher than the first data rate, the interpolation process must generate more sample values than are received. The generation of more sample values is performed in interpolator 16 which generates sample values using a 12 tap FIR filter. The process of interpolating from a first data sample rate to a second data sample rate is explained in detail in an article by A. Luthra et al, entitled Sampling-Rate Conversion of Video Signals from the SMPTE Journal, November 1991, pgs. 869-879 which is incorporated by reference for its teachings on video sample rate interpolation. Those skilled in the art will be able to understand the interpolation process performed in interpolation 16 by referring to this article along with above referenced U.S. patent.

Interpolator 16 resamples, interpolates, bandlimits, and gain adjusts the input samples values by a digital filtering process. The digital filtering process first multiplies the input sample values by the appropriate coefficients selected by the coefficient/read control signal 25 in tap cells 31 and then sums like input samples in a summer 32. The digital filtering process performed by the interpolator 16 uses conventional finite impulse response (FIR) filtering techniques.

Coefficient/read control signal 25 is used to select which coefficients the interpolator 16 will use in its digital filtering process to generate interpolated samples. The filters implemented through these coefficient values perform rate conversion from the first sample data rate, 14.5 MHz to the second sample data rate, 17.7 MHz, adjust the gain of the signal and bandlimit the signal. As detailed in the U.S. patent, interpolator 16 can select the coefficients it will use from among 108 different sets of coefficients. A different set of coefficients may be selected for each period of the gated 17.7 MHz clock signal.

In addition to the selection requirements for interpolation, gain adjustment, and bandwidth limitation, the coefficients are also appropriately selected so the interpolator can properly resample the input sample values. The coefficient/read control signal 25 indicates when the orthogonal samples provided by the FIFO 12 should be resampled so corresponding samples on successive lines on the picture screen are offset. This offset avoids possible spatial distortion in the display image which may result if the orthogonally sampled input signals Y, U, and V were displayed. Thus, this signal controls which coefficients are needed to achieve the proper resampling of the digital signal.

As mentioned above, the appropriate coefficients are also selected so that in addition to resampling the input sample values, the digital filtering process also gain adjusts, bandlimits and interpolates the input sample values, generating the 20-bit output values of the interpolator 16, PIPELINE OUT. These sample values are interpolated, gain adjusted, bandlimited, and resampled. In sum, during the digital filtering process, the sample values are interpolated from the 14.5 MHz input samples to be in proper time alignment for a 17.7 MHz luminance signal, bandlimited to the PAL standard bandwidth for luminance information (generally 5.0 MHz), and gain adjusted.

Interpolator/modulator 17 receives and processes the interpolated, resampled, bandlimited, gain adjusted 20-bit luminance values held at the output of interpolator 16, the sum and difference values held at the output of FIFO memory elements 13 and 14, and the signal generated by output control 15 to generate the modulated composite PAL signal. The interpolator/modulator 17, which may be identical to the interpolator 16, is also described in detail in the above referenced U.S. patent.

Referring the FIGS. 1 and 2, the values held at the output of FIFOs 13 and 14 are read by interpolator/modulator 17 on input lines DATA A IN and DATA B IN, respectively. The input sample values on DATA A IN and DATA B IN are multiplied by appropriate coefficients in a digital filtering process to produce the coefficient modified sum and difference signals which are combined with the luminance values held at the output of interpolator 16. The luminance values are provided to the interpolation/modulator 17 via the input line PIPELINE IN to produce the digital video PAL signal.

In detail the digital signal processing is similar to that used in interpolator 16, each data sample read in on the lines DATA A IN and DATA B IN is multiplied by a coefficient in a tap cell 31. The result is summed with other like samples. i.e., sums, $U+V$, differences, $U-V$, which have been multiplied by a selected coefficient in the summer 32 thus generating a new sample which is stored in a storage cell 33.

The selection of the appropriate coefficients in the digital signal processing is similar to the selection process described above for interpolator 16. However, the bandwidths are generally 1.3 MHz for the color difference signals V and U and thus are 1.3 MHz for the luminance signal.

In addition, interpolator/modulator 17 includes compensating delay elements 34 which time-delay the coefficient modified summed sample values representing the sum, $(U+V)$ and difference, $(U-V)$ signals by an amount of time equivalent to the processing delay of the luminance signal through the interpolator 16 to align the sum and difference sample values in time with the values read into interpolator/modulator 17 on input line PIPELINE IN from the interpolator 16. In operation, interpolator 17 stores the values held at the output of interpolator 16 and FIFOs 13 and 14 when a read signal is generated by output control 15. The values stored from the output of FIFOs 13 and 14 are newer in time than the value read and stored from the output of interpolator 16 due to the processing delay incurred in interpolator 16. Thus to compensate for the processing delay, interpolator/modulator 17 holds the coefficient modified summed sample values in the delay elements 34 until the value read and stored from the output of the interpolator 16 is time aligned with the stored sample values. Then, the time aligned stored values are used in the modulation process.

The modulation process combines the luminance, sum and difference sample values to form the modulated composite PAL signal. The stored resultant values from the digital filtering process representing the sum or difference samples, i.e., the $U+V$ or $U-V$ samples, are alternately inverted in the inverter 35 and added in the summer 36 to the corresponding (in time) samples values representing the luminance signal Y, PIPELINE IN. The combination of the resultant luminance values and the alternately negated resultant sum or difference values are held at the output of the interpolator/modulator 17, PIPELINE OUT. The combination represents a sampled data signal having the sequence $Y+(\sqrt{2}/2)(U+V)$, $Y-(\sqrt{2}/2)(U\pm V)$, $Y-(\sqrt{2}/2)(U+V)$, $Y+(\sqrt{2}/2)(U\pm V)$, $Y+(\sqrt{2}/2)(U\pm V)$, ... generated at a rate of 17.7 MHz.

The clipper 18 reduces the number of bits used to represent each sample generated by the interpolator/modulator 17 from 11 to 8 or 10 to interface with a recording device or other system that may be attached this system. The limiting operation performed by the clipper 18 is controlled to generate either 8 or 10-bit values by a signal CONT provided by the device to which the output data signal 28 is provided. The clipper 18 reduces the number of bits from 11 to 8 or 10 by setting sample values larger than can be represented by 8 or 10 bits, respectively to the largest number that can be represented by 8 or 10 bits and by setting sample values smaller than can be represented by 8 or 10 bits to the respective smallest numbers that can be represented by 8 or 10 bits.

While the invention has been described in terms of an exemplary embodiment, it is contemplated that it may be practiced with modifications within the spirit and scope of the appended claims.

What is claimed is:

1. A system for converting a sampled data component video signal, received at a first sample rate and having a luminance signal component and two color-difference signal components to a digital composite video signal having a second sample rate where the first sample rate is different from the second sample rate, comprising:
   means for summing respective samples of the two color-difference component signals to produce a sum signal;
   means for subtracting samples of one of the two color-difference component signals from respective samples of the other color-difference component signal to produce a difference signal;
   converting means for converting samples of each of the luminance, sum and difference signals at the first sample rate to corresponding samples at the second sample rate, wherein the converting means includes an interpolator which generates each of the samples at the second rate from a plurality of the samples at the first rate;
   combining means for combining the sum and difference samples produced by the converting means with the luminance component samples produced by the converting means in a predetermined order to produce samples representing the composite video signal.

2. A system according to claim 1 where the combining means comprises:
   means to sum successive samples of the luminance signal with successive alternate samples of the sum and difference signals, respectively.

3. A system according to claim 2 where the combining means further comprises:
   means for inverting alternate ones of the samples of the respective sum and difference signals which are to be summed with the luminance signal.

4. A system according to claim 1, where the band of frequencies occupied by the component video signals is greater than is used by the composite video signal, further comprising:
   means for filtering the sum, difference, and luminance component signals to produce respective signals which occupy the respective bands of frequencies used by the composite video signal.

5. A system for converting a sampled data component video signal, received at a first sample rate and having a luminance signal component and two color-difference signal components to a digital composite video signal having a second sample rate where the first sample rate is different from the second sample rate, where the time alignment of the component video signal from line to line is improper for the composite video signal, comprising:
   means for summing the two color-difference component signals to produce a sum signal;
   means for subtracting one of the two color-difference component signals from the other color-difference component signal to produce a difference signal;
   converting means for converting the sample rate of the luminance, sum and difference signals to the sample rate of the composite video signal wherein said converting means comprises means for selectively interpolating means among the respective samples of the sum, difference, and luminance signals to generate samples of the respective signals in proper alignment for the composite video signal, and
   combining means for combining the converted sum and difference signals with the converted luminance component signal in a predetermined order to produce the composite video signal.

6. A system for converting a sampled data component video signal, received at a first sample rate and having a luminance signal component and two color-difference signal components to a digital composite video signal having a second sample rate where the first sample rate is different from the second sample rate, comprising:
   means for summing the two color-difference component signals to produce a sum signal;
   means for subtracting one of the two color-difference component signals from the other color-difference component signal to produce a difference signal;
   converting means for converting the sample rate of the luminance, sum and difference signals to the sample rate of the composite video signal; said converting means comprising:
      means for storing the samples of the luminance, sum and difference signals at a first rate equal to the input sample rate and for reading the respective stored samples at a second rate equal to the sample rate of the composite video signal; and
      means for interpolating the read samples of the luminance, sum and difference signals to generate respective sampled data luminance, sum and difference signals at the sample rate of the composite video signal; and
   combining means for combining the sum and difference signals with the luminance component signal in a predetermined order to produce the composite video signal.

7. A method of converting a sampled data component video signal received at a first sample rate and having a luminance signal component and two color-difference signal components to a digital composite video signal having a second sample rate where the first sample rate is difference from the second sample rate, comprising the steps of:
   (a) summing respective samples of the two color-difference component signals to produce samples of a sum signal;
   (b) taking the difference of samples of the two color-difference component signals to produce samples of a difference signal;
   (c) converting the samples of the luminance, sum and difference signals at the first sample rate to corresponding samples at the second sample rate by interpolating each of the samples of the luminance, sum and difference signals at the second rate from a plurality of a respective plurality of samples of the luminance, sum and difference signals at the first rate;
   (d) combining the samples of the converted sum and difference signals with the samples of the converted luminance component signal in a predetermined order to form the composite video signal.

8. A method according to claim 7 where step (d) comprises:
   summing successive samples of the luminance signal with successive alternate samples of the sum and difference signals.

9. A method according to claim 8 where the step (d) further comprises the step of:
   inverting alternate ones of the samples of the respective sum and difference signals which are to be summed with the luminance signal.

10. A method according to claim 7, where the band of frequencies occupied by the component video signals is greater than is used by the composite video signal, further comprising the step of:
   filtering the sum, difference, and luminance component signals to produce respective signals which occupy the respective bands of frequencies used by the composite video signal.

11. A method of converting a sampled data component video signal received at a first sample rate and having a luminance signal component and two color-difference signal components to a digital composite video signal having a second sample rate where the first sample rate is different from the second sample rate, where the time alignment of the samples of the respective component video signals is improper for the composite video signal, said method comprising the steps of:
   (a) summing the two color-difference component signals to produce a sum signal;
   (b) taking the difference of the two color-difference component signals to produce a difference signal;
   (c) converting the sample rate of the luminance, sum and difference signals to the sample rate of the composite video signal by interpolating among respective samples of the respective sum, difference, and luminance signals to generate respective samples of the sum, difference and luminance signals which are in proper alignment for the composite video signal;
   (d) combining the samples of the converted sum and difference signals with the samples of the converted luminance component signal in a predetermined order to form the composite video signal.

12. A method of converting a sampled data component video signal received at a first sample rate and having a luminance signal component and two color-difference signal components to a digital composite video signal having a second sample rate where the first sample rate is different from the second sample rate, comprising the steps of: (a) summing respective samples of the two color-difference component signals to produce samples of a sum signal;

(b) taking the difference of respective samples of the two color-difference component signals to produce samples of a difference signal;

(c) converting the sample rate of the luminance, sum and difference signals to the sample rate of the composite video signal including the steps of:

storing the samples of the luminance, sum, and difference signals at a first rate equal to the input sample rate and reading the respective stored samples at the second sample rate to the sample rate of the composite video; and interpolating among the read samples of the luminance, sum, and difference component signals to produce respective samples of the luminance, sum, and difference signal at the second sample rate; and (d) combining the samples of the sum and difference signals with the samples of the luminance component signal in a predetermined order to form the composite video signal.

* * * * *

UNITED STATES PATENT AND TRADEMARK OFFICE
CERTIFICATE OF CORRECTION

PATENT NO. : 5,249,038  
DATED : Sept. 28, 1993  
INVENTOR(S) : Kevin J. Stec

Page 1 of 2

It is certified that error appears in the above-indentified patent and that said Letters Patent is hereby corrected as shown below:

Column 2, line 68, delete
"$(U \pm V)\cos(f_p + \pi/4)$", insert --$(U \mp V)\cos(f_p + \pi/4)$--.

Column 3, lines 2 and 3,
delete "$(U \pm V)\cos(f_p + \pi/4)$", insert --$(U \mp V)\cos(f_p + \pi/4)$--.

Column 3, line 5, delete
"$Y-(\sqrt{2}/2)(U \pm V)$", insert --$Y-(\sqrt{2}/2)(U \mp V)$--.

Column 3, line 6, delete
"$Y+(\sqrt{2}/2)(U \pm V)$, $Y+(\sqrt{2}/2)(U+V)$," insert --$Y+(\sqrt{2}/2)(U \mp V)$, $Y+(\sqrt{2}/2)(U \pm V)$,--.

Column 3, line 9, delete
"$Y-(\sqrt{2}/2)(U \pm V)$, $Y-(\sqrt{2}/2)(U \pm V)$," insert
--$Y-(\sqrt{2}/2)(U \mp V)$, $Y-(\sqrt{2}/2)(U \pm V)$,--.

Column 3, line 10, before
"$Y+(\sqrt{2}/2)(U \pm V)$," insert --$Y+(\sqrt{2}/2)(U \mp V)$,--.

Column 8, lines 14 and 15,
delete "$Y+(\sqrt{2}/2)(U+V)$, $Y-(\sqrt{2}/2)(U \pm V)$, $Y-(\sqrt{2}/2)(U+V)$, $Y+(\sqrt{2}/2)(U \pm V)$, $Y+(\sqrt{2}/2)(U \pm V)$," insert $Y+(\sqrt{2}/2)(U \pm V)$, $Y-(\sqrt{2}/2)(U \mp V)$, $Y-(\sqrt{2}/2)(U \pm V)$, $Y+(\sqrt{2}/2)(U \mp V)$, $Y+(\sqrt{2}/2)(U \pm V)$,--.

UNITED STATES PATENT AND TRADEMARK OFFICE
CERTIFICATE OF CORRECTION

PATENT NO. : 5,249,038
DATED : Sept. 28, 1993
INVENTOR(S) : Kevin J. Stec

It is certified that error appears in the above-indentified patent and that said Letters Patent is hereby corrected as shown below:

Column 9, line 32, after
"interpolating" the word "means" should be deleted.

Column 10, line 8, after "is"
change the word "difference" to --different--.

Column 12, lines 7 and 8, at
line 7 after "rate" delete "to the sample rate of the composite video".

Signed and Sealed this

Third Day of May, 1994

Attest:

BRUCE LEHMAN

Attesting Officer

Commissioner of Patents and Trademarks